United States Patent [19]
Liebe et al.

[11] 3,965,378
[45] June 22, 1976

[54] POLE COIL FOR ELECTRIC MACHINES AND APPARATUS

[75] Inventors: Wolfgang Liebe; Werner Leistner, both of Berlin, Germany

[73] Assignee: Siemens Aktiengesellschaft, Munich, Germany

[22] Filed: May 23, 1974

[21] Appl. No.: 472,701

[30] Foreign Application Priority Data
May 29, 1973   Germany............................ 2328265

[52] U.S. Cl................................. 310/65; 165/185; 336/61
[51] Int. Cl.² ....................................... H02K 1/32
[58] Field of Search .................. 310/50, 53, 55, 58, 310/59, 60, 61, 64, 65, 162, 163, 164, 192, 193, 194, 261, 264, 269, 270, 271; 165/185; 336/61; 174/16 HS

[56] References Cited
UNITED STATES PATENTS

| | | | |
|---|---|---|---|
| 497,504 | 5/1893 | Stuart ................................. | 310/64 |
| 1,010,126 | 11/1911 | Dick ..................................... | 310/64 |
| 1,162,482 | 11/1915 | Hiss ..................................... | 310/194 |
| 1,162,483 | 11/1915 | Hiss ..................................... | 310/194 |
| 1,253,242 | 1/1918 | Hiss ..................................... | 310/194 |
| 2,756,358 | 7/1956 | Johnson .............................. | 310/64 |
| 2,769,104 | 10/1956 | Hirsch.................................. | 310/64 |
| 2,913,606 | 11/1959 | Guardiola ........................... | 310/65 |
| 3,333,131 | 7/1965 | Bush ................................... | 310/194 |
| 3,585,276 | 6/1971 | Beckett................................ | 310/65 |
| 3,777,190 | 12/1973 | Guimbal .............................. | 310/60 |

*Primary Examiner*—R. Skudy
*Attorney, Agent, or Firm*—Kenyon & Kenyon Reilly Carr & Chapin

[57] ABSTRACT

A pole coil wherein improved heat transfer at cooling fins thereof is achieved and includes cooling fins which are subdivided in the longitudinal direction into short portions which are bent out so that they are disaligned with each other. The pole coil is suitable for electrical machines and apparatus and especially for the revolving excitation windings of synchronous electric machines.

1 Claim, 4 Drawing Figures

POLE COIL FOR ELECTRIC MACHINES AND APPARATUS

BACKGROUND OF THE INVENTION

It is known to improve the cooling conditions in the current-carrying conductors of a pole coil for electric machines and apparatus, particularly for revolving excitation windings of synchronous electric machines, by making the pole coil with an edgewise wound winding with protruding cooling fins. In such a case, the cooling fins can be formed by widening or bringing out the conductors in individual turns; the have then the same thickness as the conductor. If they they to be thinner than the conductors of the pole coil, they can be made by profiling the conductors themselves accordingly or by arranging thin metallic ribbons of larger width directly on the conductors. In this connection, reference may be had to Deutsches Gebrauchsmuster 1,842,890 and Austrian Pat. No. 105,958. One thereby obtains an increase of the heat-emitting surface of the pole coil. However, this increase of the area by cooling fins cannot go arbitrarily far, as the height of the fins must remain limited for reasons of strength and the fins cannot be set too closely together for flow reasons.

SUMMARY OF THE INVENTION

It is an object of the invention to improve the heat transfer conditions in such a pole coil equipped with cooling fins still further.

To realize this object and according to a feature of the invention, the cooling fins in a pole coil of the kind described above are subdivided in the longitudinal direction into short sections which are bent out so that they are not aligned with each other. Through this alternating deflection of the cooling fins from their original position, the length of the cooling fins, which otherwise agrees with the length of the sides of the pole coil, is subdivided into short cooling fin sections which are offset with respect to each other. Instead of one long cooling fin, one therefore obtains several short cooling fin sections, which are disposed one behind the other and do not line up. However, this special configuration has a favorable effect on the boundary layer which forms when the cooling medium flows past and the heat transfer coefficient is increased. This means that more heat can be removed from a pole coil of the same dimensions than would be the case with cooling fins not disaligned with respect to each other. The invention affords the advantage that through special shaping in advance, or also through later deformation, the heat loss of cooling fins can be increased. This advantageous effect is found in cooling fins with transversal as well as with longitudinal flow. In each case, namely, with longitudinal flow, transversal flow or with a combination of both flow directions, an improvement of the heat transfer is achieved by the deflected, disaligned cooling fin.

The cooling fins can be subdivided into short sections which are bent out alternatingly so that they do not line up; this subdivision can be made in any desired manner, particularly periodically. Thus, one can make the cooling fins wavy, whereby short, successive, not aligned cooling fin sections are provided, even though the continuity of the cooling fin is maintained. This waviness affords the advantage that the cross-section of the current-carrying conductor, of which the cooling fin is part, is not reduced. However, the individual short sections can also be delineated by cuts, which is advisable for thicker cooling fins, and by then bending out each cooling fin section in a suitable, non-aligned manner. Each section can be bent out here toward one or both sides.

Although the invention is illustrated and described herein as a pole coil for electric machines and apparatus, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENT OF THE INVENTION

Figure 1:
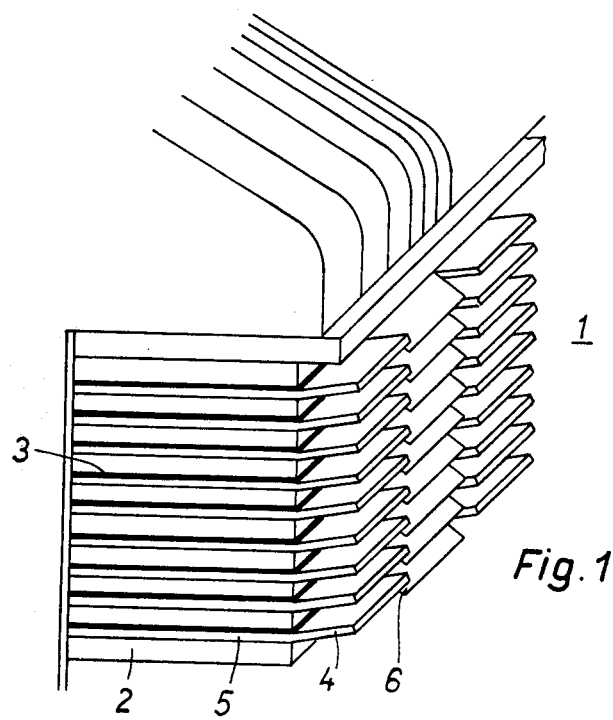
FIG. 1 is a schematic perspective diagram of a pole coil according to the invention. The pole coil is shown equipped with cooling means configured according to one embodiment of the invention.
Figure 2:
FIG. 2 is an elevation view of the cooling means of the pole coil in FIG. 1.

The pole coil 1 of the revolving excitation winding of a synchronous electric machine, particularly of a hydraulic generator of the salient-pole type of construction consists of edgewise wound, ribbon-shaped conductors 2, usually of copper, which are insulated from each other by interposed insulating layers 3. Because these pole coils 1 are cooled by a gaseous coolant, usually cooling air which flows along the lateral surfaces of the pole coil 1, there are provided narrow cooling fins 4 for the purpose of increasing the heat-emitting area. These cooling fins 4 are located at the end surfaces and/or on the side surfaces of the pole coils. The cooling fins 4 protrude beyond the surfaces proper of the pole coil 1 at regular spacings after one or several turns. In the pole coil 1 shown, each turn consists of a relatively thick, ribbon-shaped conductor 2, on which is laid directly a thin, ribbon-shaped conductor 5 whose width is greater than that of the conductor 2, so that the protruding cooling fin 4 is produced.

Each cooling fin is provided at equal spacings with cuts 6 and each of the short cooling fin sections 7 formed in this manner is bent out to one side from its original position. Successive cooling fin sections are bent out here toward opposite sides. The entire cooling fin 4 is therefore subdivided in the longitudinal direction into short sections 7, which are deflected alternatingly so that they are not lined up. This has the result that flow-wise many short, not aligned, successive cooling fins are formed from one long cooling fin. This alters the formation of boundary layers, which has a considerable effect on the heat loss, as this boundary layer must be formed anew at each short fin and accordingly, also the thermal starting distance. This, however, results in an increase of the heat transfer coefficient and therefore, in an improvement of the heat transfer.

Figure 3:
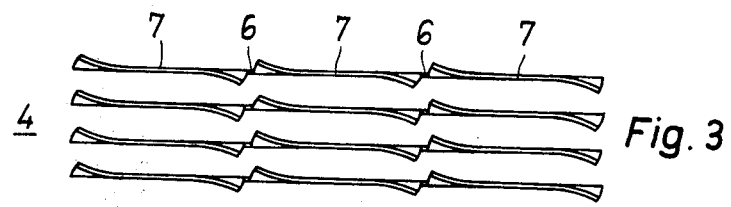
FIG. 3 illustrates the fin sections of the cooling means configured according to another embodiment of the invention.

FIG. 3 shows another possibility of deflecting the cooling fins 4. Here, the individual sections 7 of the cooling fins 4, separated from each other by cuts 6, are deflected toward both sides. This, too, results in a non-aligned, periodic deflection of the individual sections 7 and in an improvement of the heat transfer.

Figure 4:
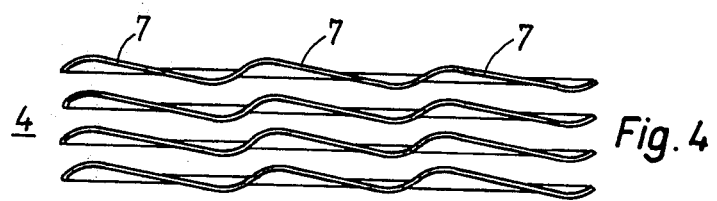
FIG. 4 illustrates another configuration of the cooling means according to still another embodiment of the invention.

In the example of the embodiment shown in FIG. 4, on the other hand, the cuts 6 in the cooling fins 4 have been dispensed with and the individual sections 7 are produced by periodic waviness of the cooling fins 4. The cooling fins 4 are bent out alternatingly in a disaligned manner and perform with respect to flow conditions like the series-connected, short, disaligned cooling fins.

What is claimed is:
1. A pole coil for electrical machines, comprising:
   a plurality of aligned turns wound from a flat conductor wound on edge, and
   a plurality of cooling fin means corresponding to respective ones of each of said turns, each of said cooling fin means comprising a ribbon disposed in heat-conductive contact with the corresponding turn of said conductor and extending outwardly from the end surfaces of the pole coil, said ribbon being subdivided longitudinally into a plurality of short fin portions projecting out beyond the conductor, said fin portions being disposed successively one next to the other in the longitudinal direction of the conductor and being disaligned in a direction perpendicular to said longitudinal direction so that each two mutually adjacent ones of said fin portions of each cooling fin means are longitudinally disaligned with respect to each other, each of said fin portions being integral with said ribbon and with each other so as to constitute a unitary part of said ribbon, said unitary part being bent to have a wave-like shape to achieve said disalignment of said fin portions, longitudinally corresponding ones of said fin portions of each of said cooling fin means being disaligned in the same direction.

* * * * *